Figure 1:
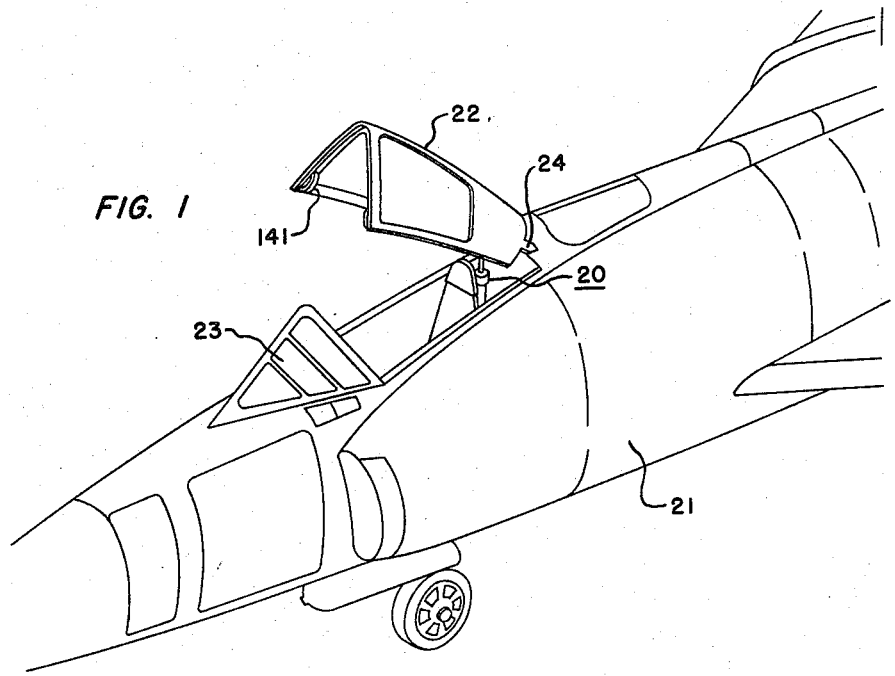

Feb. 9, 1960   H. F. MOHRLOCK, JR   2,924,403
ACTUATOR DEVICE

Filed June 12, 1956   5 Sheets-Sheet 1

INVENTOR.
HUGO F. MOHRLOCK JR.
BY
ATTORNEY

INVENTOR.
HUGO F. MOHRLOCK JR.
BY
ATTORNEY

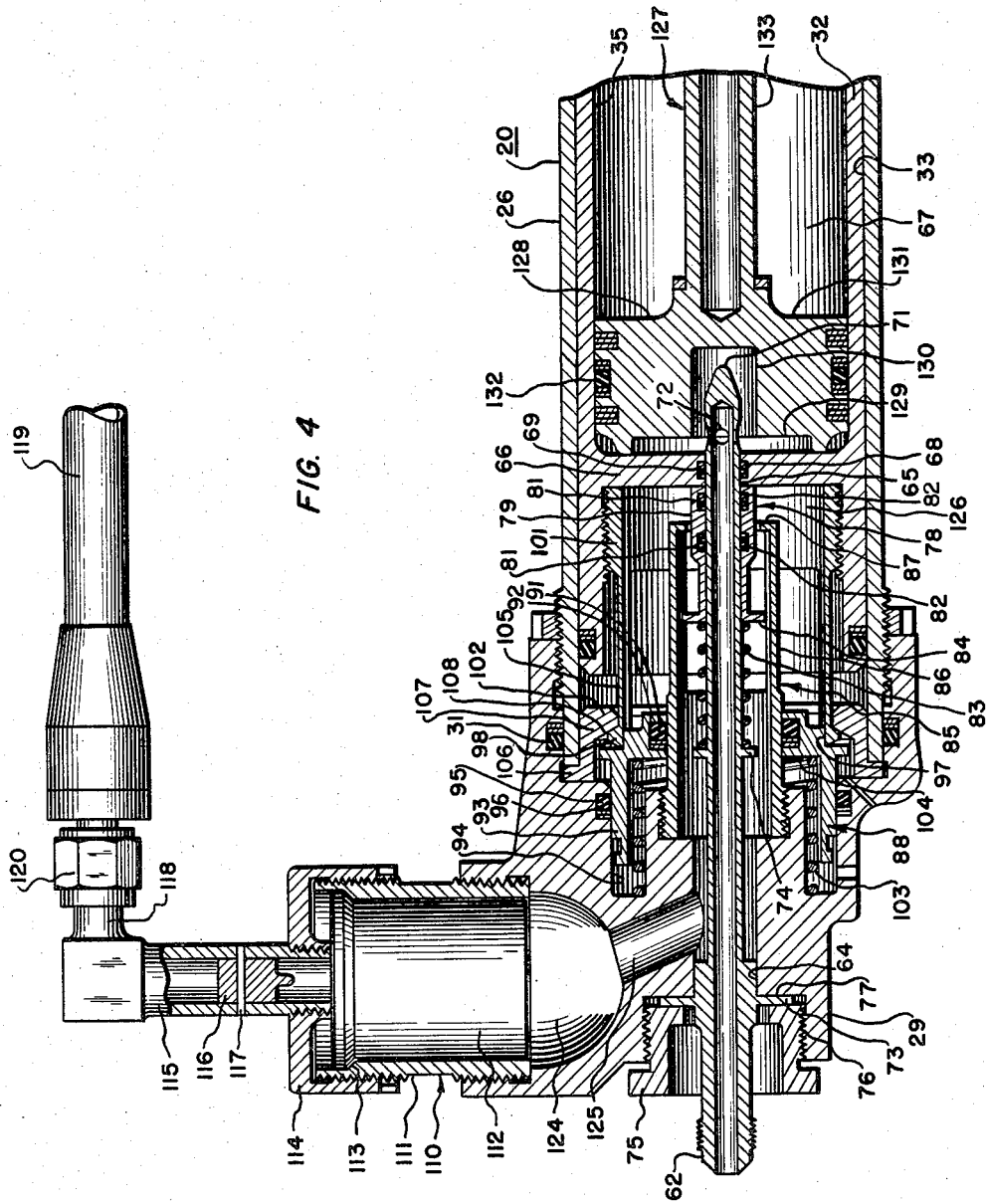

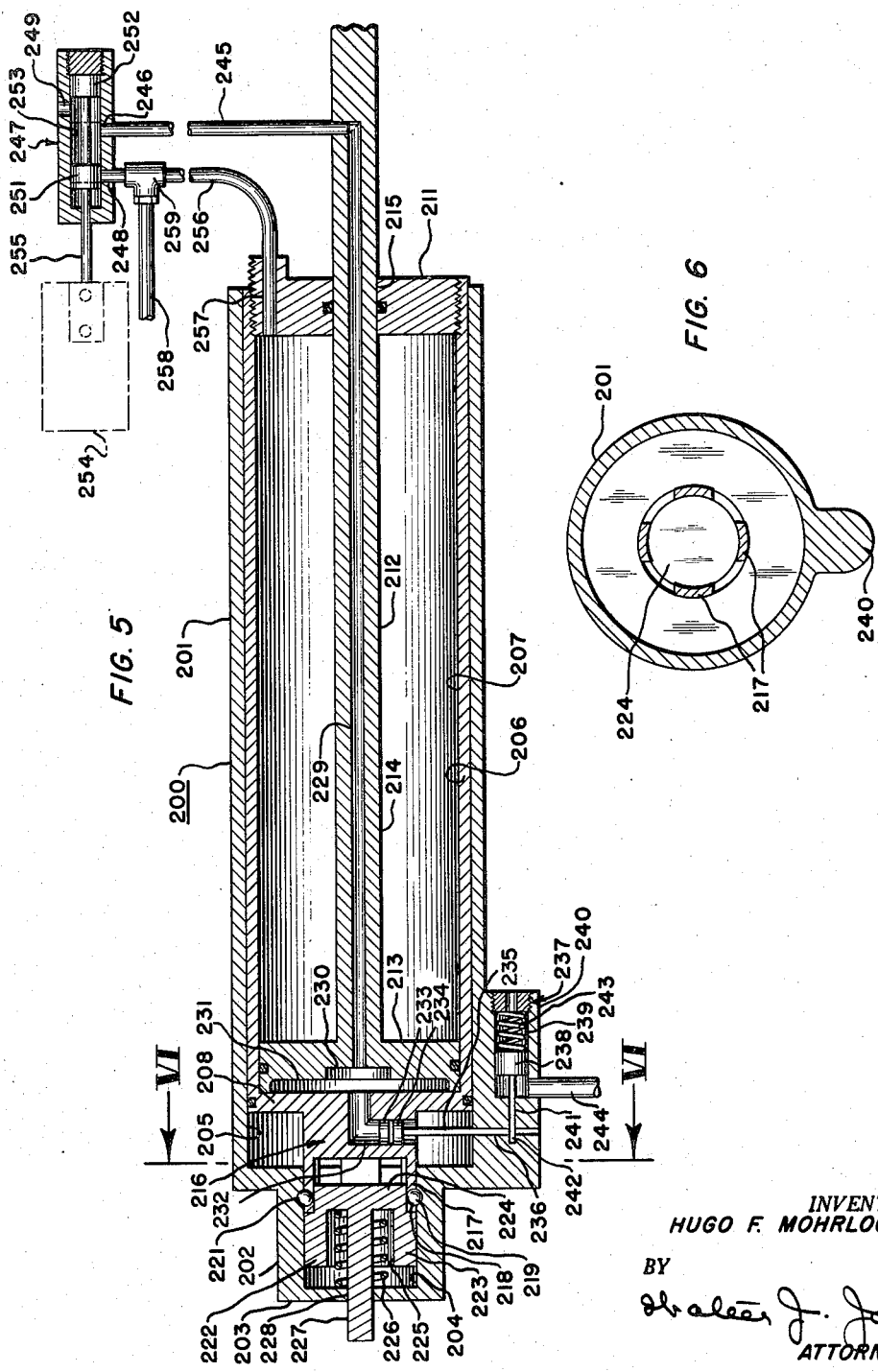

Feb. 9, 1960                H. F. MOHRLOCK, JR                2,924,403
                              ACTUATOR DEVICE
Filed June 12, 1956                                      5 Sheets-Sheet 5

INVENTOR.
HUGO F. MOHRLOCK JR.
BY
 *Walter J. Jason*
ATTORNEY

# United States Patent Office 2,924,403
Patented Feb. 9, 1960

2,924,403
ACTUATOR DEVICE

Hugo F. Mohrlock, Jr., San Diego, Calif., assignor to General Dynamics Corporation, San Diego, Calif., a corporation of Delaware Application June 12, 1956, Serial No. 590,985

13 Claims. (Cl. 244—121)

The present invention relates to actuating devices and more particularly to an improved form of actuating device adapted to serve in one capacity as a fastening means to secure one structure to another and in other capacities to act as a counterbalance to assist in the movement of such structures relative one to the other and to physically separate such structures when required.

The present invention finds primary use in connection with aircraft for controlling the movements of a canopy relative to the body structure of an aircraft.

Aircraft canopies or pilot enclosures may be classified as being of two types based on the manner in which the canopy opens to permit entry to and egress from the cockpit, i.e., horizontal sliding type and hinged type. It is in connection with canopies of the hinged type that the present actuating device finds particular application.

By reason of the high altitudes and high speeds at which present day aircraft operate a number of problems concerning the canopy have been brought into being. To permit flying at high altitudes cockpits are pressurized, which results in a force of substantial amount being applied to a canopy. Therefore, to withstand this force canopies necessarily are of heavy construction making them difficult to move from closed to open position when on the ground. Frequently, therefore, it is required that a force applying means be used to assist in opening the canopy in order that admission may be gained to the cockpit. The present actuating device serves as a counterbalance and affords effective assistance to an operator to render it an easy task to open a canopy.

The jettisoning of a canopy when an emergency situation arises while an airplane is flying at high speeds also gives rise to problems. To prevent damage to the airplane by a jettisoned canopy striking a portion of the airplane, such as the vertical stabilizer, the actuator device must have sufficient ejecting power to throw the canopy completely clear of the airplane. The present actuator device does develop a throwing force which assures safe jettisoning of the canopy.

Further, a canopy must be firmly secured to the airplane body structure to properly seal against pressurization leaks from within the interior of the canopy during flight.

Accordingly, it is an object of the present invention to provide an actuator device of improved construction which effectively serves as an attachment means for a canopy and which is capable of assisting the movement of the canopy in a desired manner and of jettisoning of the canopy when required in an emergency situation.

Another object of the present invention is to provide a novel actuating device of unitary, light and compact construction which operates as a counterbalance, a hold-down and as an ejector when used in connection with an airplane canopy.

Another object of this invention is to provide an actuating device of improved construction which serves as a counterbalance, hold-down and ejector for an airplane canopy and which utilizes gas under pressure as the source of energy in its various operations.

Another object of this invention is to provide in an actuating device of the character above novel valving means which operates to maintain compressed gas used for actuation in proper confinement during the ejection operation whereby maximum pressure is available throughout the entire ejection operation.

Another object of this invention is to provide an improved actuating device for a canopy having novel locking means for preventing an accidental or premature ejecting operation when the actuating device is normally being operated as a counterbalance and hold-down device.

Another object of this invention is to provide a canopy operating device having improved structural details which result in an article which is light in weight, effective in operation, and economical to manufacture.

Figure 3:
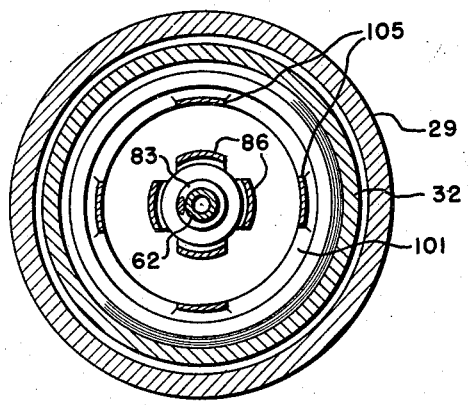
Figure 2:
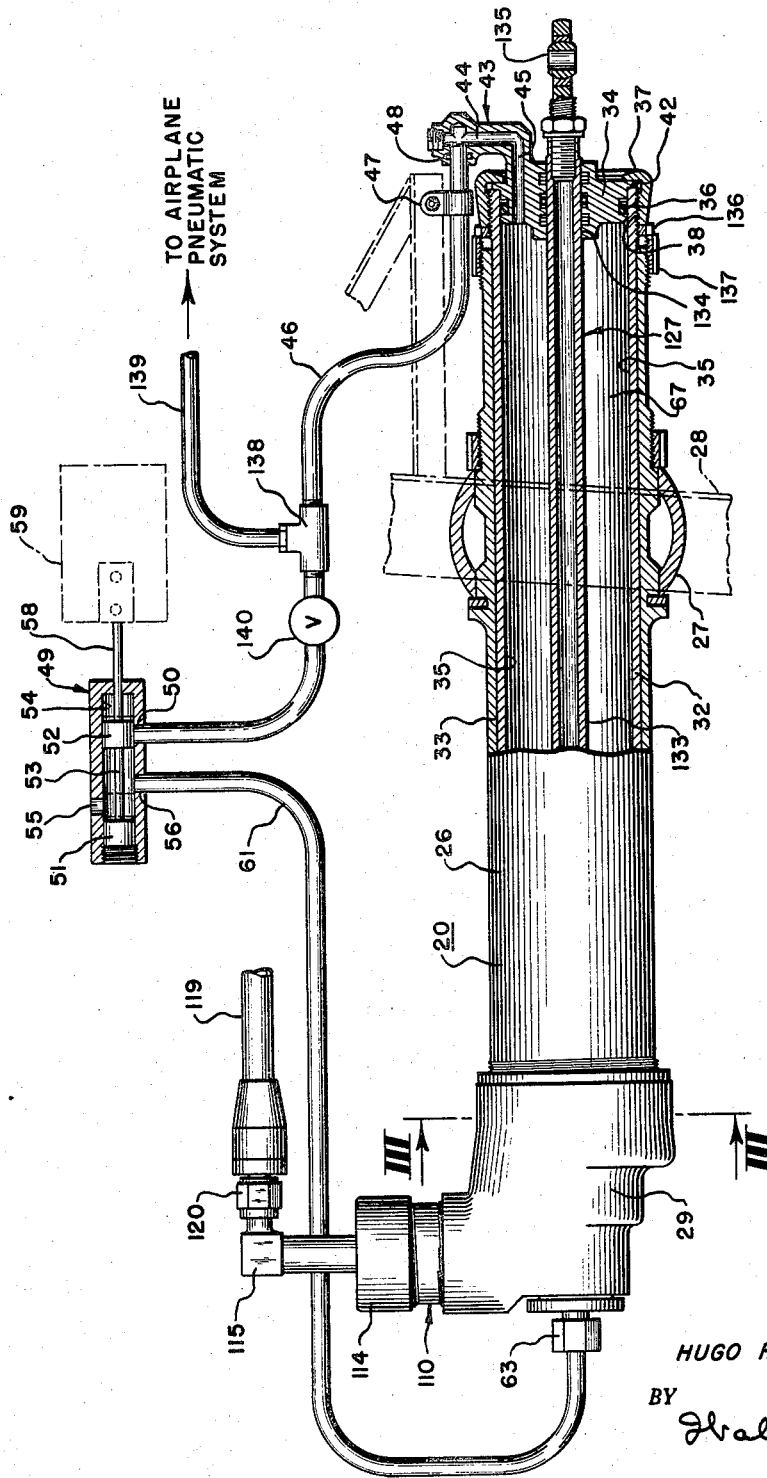
Figure 7:
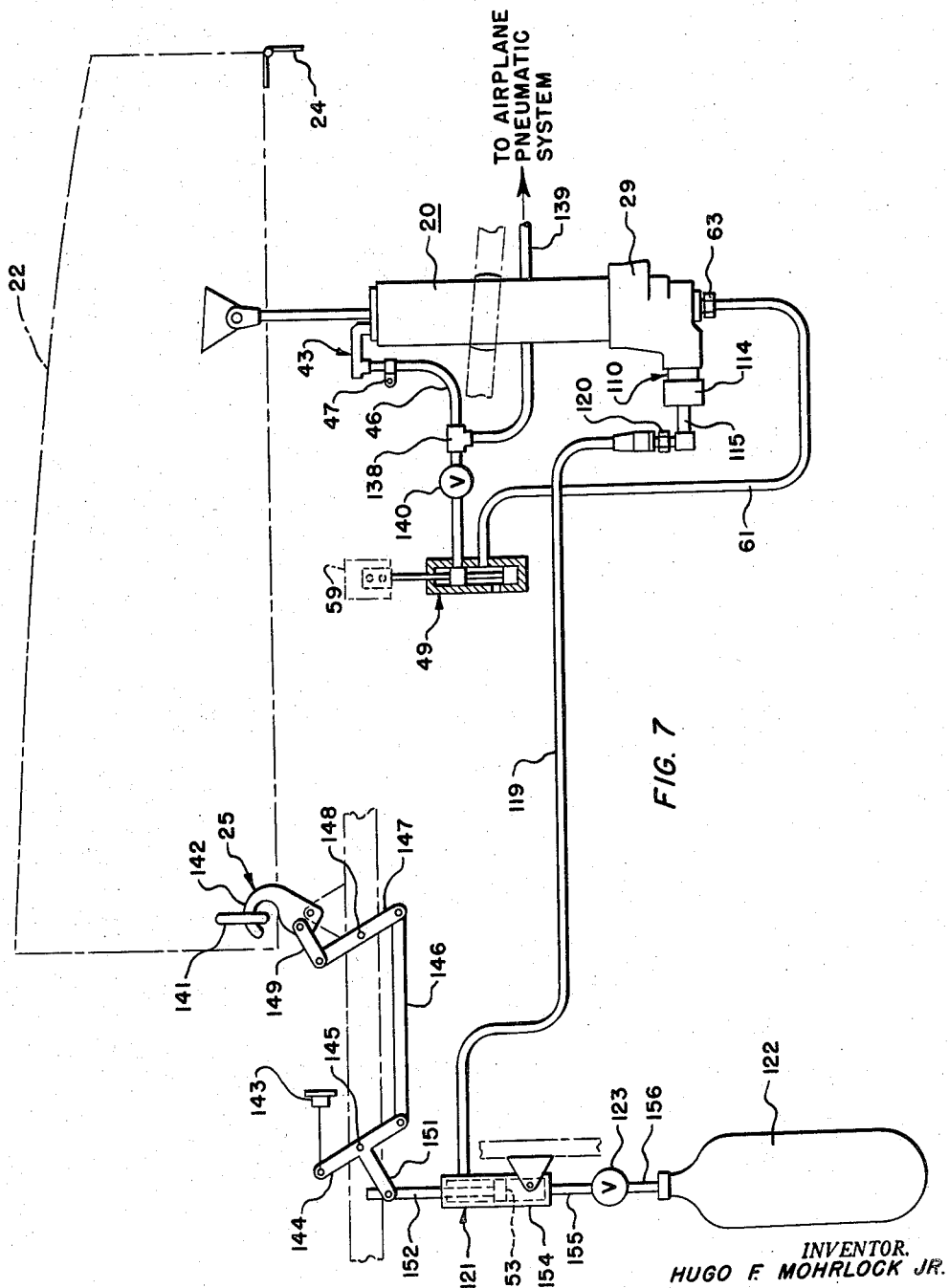

Other objects and features of the present invention will be readily apparent to those skilled in the art from the following specification and appended drawings wherein is illustrated a preferred form of the invention, and in which:

Figure 1 is a fragmentary perspective view of an airplane having its canopy supported in open position and employing an actuator device which embodies the present invention, Figure 2 is a sectional view along the longitudinal axis of an actuator device made in accordance with the present invention, with parts shown in elevation to facilitate illustration of the invention, and also including in diagrammatic form a showing of a valve means employed by the actuator device, Figure 3 is an enlarged transverse sectional view taken along line III—III of Figure 2, Figure 4 is an enlarged longitudinal sectional view of a portion of the actuating device, Figure 5 is a longitudinal sectional view of a modified form of an actuating device shown diagrammatically, Figure 6 is an enlarged transverse sectional view taken along the line VI—VI of Figure 5, and Figure 7 is a diagrammatic illustration of the operating equipment for the canopy.

Referring now to the drawings and first to Figure 1, an actuator device is generally indicated in its entirety by the numeral 20, and is pivotally supported internally of the cockpit region of an airplane fuselage 21 for effecting operation of a rearwardly hinged canopy 22, which at its forward end mates with a fixed windshield 23 on the fuselage 21. Canopy 22 is provided with hinges 24 and usual latch assemblies 25 and is pivotally secured to the actuator device 20 forwardly of hinges 24 for counterbalancing, cinch down and for jettisoning operation as will be more fully described hereinafter.

Referring now to Figure 2, actuating device 20 is shown as embodying a housing 26 which has affixed to its exterior surface a usual self-aligning bearing element 27 adapted to be secured to convenient airplane structure 28 which is located within the cockpit area of fuselage 21. Cylinder housing 26 is provided, at its left end as viewed in Figure 2, with an end closure 29 screw threaded to housing 26 and sealed relative thereto by a usual resilient sealing ring 31 disposed in a suitable recess in closure 29. A cylinder 32 is slidably positioned within a bore 33 of housing 26 and is adapted to be ejected therefrom as will be described. Cylinder 32 is provided upon the end thereof which projects to the exterior of housing 26 with a closure member 34. Member 34 is sealed with respect to bore 35 of cylinder 32 by a resilient sealing ring 36 accommodated in an annular recess in closure 34, closure 34 being secured to cylinder 32 by a retaining cap 37 which threadedly engages threads 38 on the exterior of cylinder 32 and which overlaps a radially extending flange 42 of closure member 34 and serves to clamp flange 42 against the end surface of cylinder 32 thereby to secure closure 34 to cylinder 32.

Closure member 34 is provided with a radially extending projection 43 having a pressure passage 44 therein which extends within projection 43 to meet a passage 45 through the body of closure member 34 which passage 45 itself communicates with bore 35 of cylinder 32. A pressure conduit 46 is connected to projection 43 and opens to passage 44. Suitable clamp means 47 fitted to conduit 46 secures it to convenient structure of the airplane and normally holds it fixed relative to projection 43 and in attachment therewith. It is noted that the connection of conduit 46 to actuator 20 is at the inner side of projection 43, and in the area of this connection conduit 46 lies parallel to the longitudinal axis of cylinder 32. This manner and location of attachment permits the ready separation of projection 43 from conduit 46 without injury to the conduit 46, when cylinder 32 is ejected from housing 26. A sealing ring 48 positioned in an internal annular groove in the passage 44 provides a pressure seat around conduit 46 at its projection into passage 44 to prevent leakage therearound. The opposite end of pressure conduit 46 is suitably attached to a usual slide valve member 49 at a valve port 50. Valve member 49 controls the application of pressure to cylinder 32 for a purpose to be described. It includes tandem slide valves 51 and 52 interconnected by rod 53 and positioned for reciprocal movement within bore 54 of the valve 49. In addition to port 50 valve 49 includes ports 55 and 56, port 55 being adapted to be covered and uncovered by slide valve 51 while port 50 is adapted to be covered and uncovered by slide valve 52 in the longitudinal movement of such valves within bore 54. Movement of valves 51 and 52 is effected through an actuator arm 58 which is connected to slide valve 52. Actuator arm 58 is appropriately connected to and is operative by an actuator 59, shown diagrammatically in dash-dot outline, which is suitably located in the cockpit to be controlled by the pilot. The particular construction of actuator 59 is not a part of this invention. It may be any conventional device, electrical or mechanical, which will, when operated by the pilot, bring about movement of arm 58 to move valves 51 and 52 between desired positions relative to the valve ports of valve 49. In Figure 2 arm 58 has actuated valves 51 and 52 to the positions shown wherein valve 52 closes port 50 and valve 51 lies spaced from its port 55 which lies open so that port 56 may vent to atmosphere therethrough for a purpose to be described. When actuator arm 58 is moved to the right, valve 52 will uncover valve port 50 as valve 51 covers valve port 55, and valve ports 50 and 56 will be placed in communication with each other through bore 54. The purpose of covering and uncovering valve ports 50 and 55 will be hereinafter discussed.

A pressure conduit 61 communicates at one end with valve port 56 and at its opposite end communicates with the interior of cylinder 32 through a hollow sleeve or tubular member 62, the conduit 61 being secured to the exterior end of sleeve 62 by a usual connector fitting 63. Sleeve 62 is axially disposed with respect to cylinder 32, being positioned in an axial bore 64 provided in end closure 29 and extending or projecting inwardly into cylinder 32 to pass through an axial bore 65 provided in an interior transverse wall 66 of cylinder 32. Wall 66 lies spaced from the end of cylinder 32 and with the interior side walls of cylinder 32 and end closure 34 defines a chamber 67. An appropriate annular sealing ring 68 fitted into an annular groove 69 in bore 65 of transverse wall 66 seals with sleeve 62 at its passage through bore 65. The inner end of sleeve 62 which lies disposed on the interior side of wall 66 of cylinder 32 is closed or capped as shown at 71. However, adjacent its capped end 71 sleeve 62 is provided with a number of circumferentially spaced openings 72 through which communication is had with the interior of cylinder 32. Sleeve 62 is provided on its outer surface with a pair of spaced, integral outwardly projecting flanges 73 and 74 and is retained or secured to end closure 29 by a nut 75 which mates with threads 76 afforded on end closure 29 and which clamps flange 73 between itself and a shoulder 77 on end closure 29.

Slidably mounted on sleeve 62 is a shut-off valve 78 comprising a bored body member 79 having spaced internal annular grooves 81 in which sealing rings 82 are positioned to provide a seal with respect to sleeve 62. Valve 78 is urged into engagement with interior wall 66 of cylinder 32 by a compression spring 83 interposed between flange 74 of sleeve 62 and a circumferential flange 84 on valve body 79. The purpose and operation of valve 78 will later be described.

Disposed about the central portion of sleeve 62 in spaced relationship thereto is a tubular member 85 which is suitably secured at one end to closure member 29 by a threaded connection. Projecting longitudinally from the free end of tubular member 85 are a number of fingers 86 the outer ends of which are inwardly bent as at 87 to form stops which are adapted to be engaged by flange 84 of valve 78 to limit the extent of sliding movement of valve 78 upon sleeve 62 under the bias of spring 83 when cylinder 32 is ejected from cylinder housing 26.

A locking piston 88, is slidably positioned upon tubular member 85 and is suitably pressure sealed with respect thereto by a usual annular sealing ring 91 fitted within an appropriate annular groove 92 in piston 88. Piston 88 has an annular skirt portion 93 which is slidably receivable within annular recess 94 provided in end closure 29 and is pressure sealed with respect to the walls of such recess by an annular sealing ring 95 fitted within a groove 96. Locking piston 88, at its interior end, is provided with a shoulder 97 against which rests lugs 98 of a latching member 101. Piston 88 serves to maintain lugs 98 in engagement with a sear or catch 102 under the action of a compression spring 103 which has one end seated on the bottom of recess 94 of closure 29 and its opposite end in engagement with a surface 104 of piston 88. Latching member 101 is threadedly secured to the interior end of cylinder 32 and has longitudinally extending resilient fingers 105 on the free ends of which lugs 98 are integrally formed.

Sear or catch 102 includes a radially extending flange 106 which is adapted to be clamped between a surface on end closure 29 and the end of the cylinder housing 26. Sear or catch 102 also includes an inwardly directed flange or protuberance 107 having an inclined face portion 108 which normally engages lugs 98 of latching member 101 whereby cylinder 32 is normally locked against ejection from cylinder housing 26.

An ejector or gun assembly 110 is carried by end closure 29 for effecting ejection of cylinder 32 from housing 26. Ejector assembly 110 comprises a hollow body 111 which is screw threaded into a recess in closure 29 and receives an explosive cartridge 112 having, as shown, an enlarged head which rests on a shoulder 113 of body 111. Screwed onto the end of body 111 is a cap 114 which carries a housing or fitting 115 within which is contained a usual firing pin 116. Firing pin 116 is normally restrained against operation by a shear pin 117 passing through the wall of housing 115 and the body of firing pin 116. Housing 115 is provided with a coupling portion 118 to which a conduit 119 is secured by a connector 120, conduit 119, as shown in Figure 7, leading to a release member 121, Figure 7 (later to be described), which is connected to a suitable source of energy such as a bottle 122 of compressed gas which supplies the force required to actuate firing pin 116. Appropriate valving means 123 operable by the pilot is suitably located within the airplane for effecting the release of pressurized gas from its container so that it may effect actuation of the firing pin 116 to explode cartridge 112 to accomplish the jettisoning action. It is understood that any conventional valving devices and any convenient source or type of pressure fluid such as dry air, nitrogen or carbon dioxide, may be employed to provide the necessary force for actuation of firing pin 116.

As shown in Figure 4, hollow body 111 of gun assembly 110 communicates with a chamber 124 in end closure 29, and chamber 124 has communication through a passage 125 with axial bore 64 of closure 29, which bore 64 in turn leads between fingers 86 to a chamber 126 having as one defining wall the interior wall 66 of cylinder 32 against which the explosive force developed by cartridge 112 will be brought to bear.

Actuator device 20 includes a ram 127 which connects to canopy 22 for actuation thereof. Ram 127 embodies a piston 128 having a lower face 129 with a recess 130 therein and an upper face 131.

Piston 128 is slidably positioned within cylinder 32 and is provided with suitable sealing means 132 to prevent leakage past the piston. Projecting from piston 128, and axially disposed relative to cylinder 32, is a piston rod 133 which extends through an axial bore 134 in end closure 34 and which is appropriately sealed against leakage therearound by suitable sealing means. Upon the end of piston rod 133 which is disposed exteriorly of end closure 34 there is suitably affixed a usual bearing member 135 by means of which ram 127 is pivotally connected to canopy 22 at an appropriate location thereon.

As shown in Figure 2, there is associated with retainer cap 37, which secures end closure 34 to cylinder 32, a jamb nut 136 and a spanner nut 137, with jamb nut 136 being threaded upon the exterior surface of cylinder 32 to lock cap 37 in place and spanner nut 137 having a threaded engagement with exterior threads on housing 26. Spanner nut 137 is adjustably positionable on housing 26 and is engageable by jamb nut 136 and serves to properly locate cylinder 32 relative to housing 26 in order that lugs 98 of latching member 101 will be properly positioned for engagement with sear 102.

In the present invention there are two pressure systems involved, one includes the conduit 119 which directs pressurized gas from a suitable source to the ejector assembly 110 for explosion of the cartridge thereof, the other system comprises the conduits 46 and 61 and the valve 49. The latter system is used to accomplish charging of actuator device 20 for a purpose to be described. As shown in Figure 2, conduit or pressure line 46 which extends from closure 34 to port 50 of valve 49 has attached to it a T-member 138 to which is connected a pressure line 139. Pressure line 139 leads to the pneumatic system of the airplane from which it obtains air under pressure, or if desired line 139 could be connected to any usual source of compressed gas, which may be a bottle of dry air, nitrogen or carbon dioxide suitably mounted in the cockpit and having the usual controls for release of gas. The air or gas which is fed line 139 passes to line 46 to flow in one direction into the passages in end closure 34 and therethrough into chamber 67 of cylinder 32. In the opposite direction the air or gas flows to the valve 49. When port 50 of valve 49 is open upon the operation of actuator arm 58 this compressed air or gas flows from line 46 through port 50, valve bore 54 and port 56 into line 61 to pass through sleeve 62 and out of the openings 72 thereof and act upon the inner face of piston 128 of ram 127 at the interior end of cylinder 32.

As shown, there is included in line 46 a usual shut-off valve 140 which is operable by the pilot to cut off the flow of air to line 61 when ports 50 and 56 are in communication. This valve 139 permits the pilot to hold the canopy 22 in any desired angular disposition relative to the fuselage.

Attention is now directed to Figure 7 which diagrammatically illustrates the operating and latching mechanisms for canopy 22. As shown latch assembly 25 which serves to connect canopy 22 to the fuselage comprises a catch 141 carried by the canopy 22 and a hook 142 suitably pivotably mounted to structure of the fuselage. Hook 142 is adapted to be manually moved into and out of engagement with its catch 141 by a reciprocable manual operator 143 having a pivotal connection to one end of a link member 144. Link member 144 is pivotally mounted as at 145 to fuselage structure and has pivotally connected to an arm thereof one end of a connector link 146. The opposite end of connector link 146 is pivotally secured to one end of a member 147 having a pivotal connection as at 148 to fuselage structure and which is connected by a link 149 to hook 142. It is evident that as manual operator 143 is reciprocated in opposite directions it swings link member 144 moving connector 146 to rotate member 147 and thereby rotate hook 142 into and out of latched position. Although but one hook 142 and catch 141 have been shown in Figure 7 it is understood that as many may be employed as necessary to secure the canopy and the other hook or hooks will be suitably connected together so that all hooks move in unison to latched and unlatched positions.

Automatic operation of the latch assembly 25 is provided which becomes effective at the time it is necessary to jettison canopy 22. As shown in Figure 7 link member 144 has an arm 151 which is pivotally connected to rod 152 of piston 153 provided by release member 121. Release member 121 includes a cylindrical body 154 conveniently pivotally mounted to fuselage structure and having a port therein to which one end of line 119 is suitably connected whereby line 119 may communicate with the interior of body 154. Piston 153 is appropriately sealed with respect to the interior walls of body 154 to prevent leakage therearound. Normally, piston 153 will be positioned below the port for line 119 so that gas cannot enter line 119 until piston 153 travels to a position upwardly beyond the port opening. Body 154 is connected by a line 155 to control valve 123 which is interconnected by line 156 to bottle 122 which contains compressed gas or air. To effect automatic unlatching the pilot will actuate valve 123 to release the gas of bottle 122. This gas will enter body 154 to act on piston 153 to move it and piston rod 152 upwardly to rotate link member 144 and thereby actuate links 146, 147 and 149 to rotate hook 142 to its unlatched position. In its upward movement piston 153 will, after it has effected actuation of hook 142 to unlatched position, pass beyond the port opening to line 119 so that the released gas will also enter line 119 to actuate the gun assembly 110 to effect the jettisoning of canopy 22 as will be described hereinafter.

The various operations of the actuator device 20 will now be described.

When it is desired that actuator device 20 serve or operate as a counterbalance to assist the pilot in movement of the canopy 22 the pilot will first actuate manual operator 143 to release latches 25 which secure the canopy 22 to the airplane fuselage and then operate actuator 59, which is conveniently located to his hand, to move actuator arm 58 to the right to carry slide valves 51 and 52 to their dotted outline position of Figure 2. This will cause slide valve 51 to close port 55 and slide valve 52 to uncover port 50 thereby placing conduit 46 in communication with conduit 61 by way of ports 50 and 56 and bore 54. In this condition a charge of compressed gas can now be passed from line 139 through line 46 to flow in one direction into chamber 67 of cylinder 32 and in the other to pass through bore 54 of valve 49 and line 61 to act upon the lower face of piston 128 of ram 127 positioned at the interior end of cylinder 32. The operation of ram 127 will now be described in connection with Figure 4. It is evident that the compressed air from the airplane's pneumatic system which is supplied to cylinder 32 will be at the same pressure at the opposite sides of piston 128. However, this pressure acts with unequal force upon the opposite faces of the piston 128, with a greater force being applied to lower face 129 because the area of the lower piston face 129 on which pressure is applied is greater than the area of the upper piston face 131 by the area of the piston rod 133. Accordingly, since a greater force is acting on the bottom of piston 128 ram 127 will move to the right to project its rod 133 outwardly from cylinder 32. Since the exterior end of rod 133 is connected to canopy 22, it will, when moved outwardly of cylinder 32 under the action of the gas within cylinder 32, apply a force to the canopy 22 in the direction of its opening movement. This force, in the present device, is designed to be of an amount which will approximate the weight of canopy 22. The relative proportions of the areas of the opposed faces of piston 128, and the pressure value of the compressed gas supplied are so selected that a force of the desired amount to balance the weight of canopy 22 will be developed. It is evident that knowing the weight of canopy 22 it is only a matter of usual engineering to arrive at proper proportions for piston 128 and a proper value of compressed gas to generate a force in ram 127 which will balance the weight of the canopy.

With the weight of canopy 22 balanced by the force of ram 127 it requires only minor effort on the part of the pilot to swing canopy 22 on its hinge 24 into its open position. When the pilot has moved canopy 22 to a desired position he actuates shut-off valve 140 thereby to lock canopy 22 in place, shut-off valve 140 serving to dam the free flow of air acting on the upper and lower faces of piston 128.

When it is desired that actuator device 20 serve in the capacity of hold-down, the pilot after actuating shut-off valve 140 to open position manually moves canopy 22 into closed position relative to the windshield 23 of the airplane, the counterbalance force afforded by ram 127 assisting the pilot in effecting a smooth, easy closure. Thereafter he effects operation of actuator arm 58 of valve 49 to move slide valves 51 and 52 to their full line positions illustrated in Figure 2 wherein slide valve 51 uncovers port 55 to vent line 61 to atmosphere and slide valve 52 closes port 50 shutting off the flow of compressed gas from line 46. With line 61 venting to atmosphere through ports 56 and 55 the compressed gas acting on the lower face 129 of piston 128 will pass therethrough to exhaust into the atmosphere. But since port 50 is closed full gas pressure is still maintained within cylinder 32 for application upon the upper face 131 of piston 128, which pressure will act to tightly hold ram 127 in its retracted position with its piston 128 contiguous to transverse wall 66 of cylinder 32. The force of this confined gas acts through ram 127 to apply a holding force on canopy 22 to maintain it tightly in its closed position and in sealed relationship with the aircraft structure with which its edges mate.

In the event that an emergency condition arises, such as engine failure during flight, canopy 22 must be jettisoned to provide an avenue of escape for the pilot. The pilot cannot release the latches and merely release the pressure in cylinder 32 and depend on the internal force of the pressurized cabin and/or on external wind forces to blow the canopy off. The action of the blown canopy would be too erratic to trust that it would not damage aircraft structure or somehow injure the pilot. Accordingly, it is required that the canopy 22 be jettisoned with sufficient force that it will be catapulted a sufficient distance from the airplane that it will clear all structure.

When it becomes necessary to jettison the canopy 22, the pilot first releases canopy latches 25 by actuation of valve 123 which releases compressed gas from bottle 122 into body 154 of release member 121.

This gas moves piston 153 and its rod 152 upwardly to actuate link members 144, 146, 147 and 149 to rotate hooks 142 to unlocked position. Further, as previously described, this gas in body 154 will enter line 119 when piston 153 moves beyond the port opening for line 119. Line 119 directs this gas to the ejector assembly 110 for action upon firing pin 116 to rupture shear pin 117 whereby firing pin 116 strikes cartridge 112 detonating it. Expanding gas from this detonation enters chamber 124 in end closure 29, flows through passage 125 and axial bore 64 into chamber 126 at the end of cylinder 32 where the force of this gas acts against transverse wall 66 of cylinder 32 and upon the inner face of locking piston 88. Locking piston 88, under this pressure, will be forced inwardly within its recess 94 against the bias of its spring 103 to carry shoulder 97 of piston 88 free of lugs 98 of latching member 101.

With lugs 98 no longer restrained by shoulder 97 resilient fingers 105, which carry the lugs, are free to deflect inwardly under the pressure of the gases acting upon cylinder wall 66. Lugs 98 will then slide off of inclined faces 108 of sear 102. As soon as lugs 98 slide clear of the inclined faces 108 of sear 102 cylinder 32 together with its contained ram 127 will eject from cylinder housing 26 under the force of these explosion generated gases. As cylinder 32 moves from housing 26 the restraint offered by transverse wall 66 to valve 78 is removed and spring 83 urges it to follow in the direction of movement of cylinder 32 until flange 84 of valve 78 engages stop means 87 on fingers 86 of tubular member 85. In this position, the pair of spaced resilient sealing rings carried by valve 78 will be disposed on either side of openings 72 of sleeve 62. With openings 72 closed the gases developed by the explosion cannot enter sleeve 62 and pass therethrough back through line 61 to vent through ports 55 and 56 to atmosphere. Thus the force of these gases is not diminished through leakage and remains constantly and effectively applied to transverse wall 66 to force cylinder 32 from its housing 26.

In its ejecting movement cylinder 32 separates from line 46, which, as has been stated, is so located that it offers no interference to the movement of cylinder 32 but is readily disengageable from its attachment to upper closure member 34.

The power developed by the exploding cartridge 112 is sufficiently great that it acts to eject cylinder 32 and its ram 127 violently from housing 26, and this force of ejection is transmitted by ram 127 to canopy 22 to tear it loose from its hinges 24 and hurl it free and completely clear of the airplane.

A modified actuator device is illustrated in Figures 5 and 6 and is indicated generally by the numeral 200. Actuator device 200 comprises a cylinder housing 201 having a smaller diameter integral cylindrical portion 202 projecting from one end. Portion 202 has a closing end wall 203 and has a bore 204 which opens into bore 205 of cylinder housing 201. Within bore 205 is slidably disposed a cylinder 206 having a bore 207 closed at one end by integral wall 208 and at its opposite end by a closure member 211 which has a threaded engagement with interior threads on cylinder 206. Slidably received within cylinder 206 is a ram 212 comprising a piston 213 and a rod 214 which is axially disposed relative to cylinder 206 and projects through an axial bore 215 in closure member 211 to extend to the exterior of cylinder 206. The exterior end of rod 214 is adapted to be secured to canopy 22 in any suitable manner for the same purpose as rod 133 of ram 127 of the first embodiment. Piston 213 is suitably sealed with respect to the interior walls of cylinder 206 to prevent leakage therepast, and suitable sealing means are applied about rod 214 in its passage through axial bore 215 in closure member 211.

A coextensive reduced diameter portion 216 is provided on cylinder end wall 208 and carries longitudinally projecting, resilient fingers 217 having suitable ball retaining openings 218 formed therein in which balls 219 are fitted for free rotation therein. Fingers 219 are adapted to project into bore 204 of housing portion 202 to position balls 219 for reception within detent recesses 221 provided in walls defining bore 204. Balls 219 are adapted to be held within detent recesses 221 by a locking piston 222. Locking piston 222 is slidably movable within bore 204 of housing portion 202 and comprises a body member 223 cut away at one end to form a reduced portion 224 which is adapted to overlie balls 219. With balls 219 restrained within their recesses 221 fingers 217 carrying balls 219 will be locked to cylindrical housing 201 to restrain cylinder 206 against movement relative thereto.

Body member 223 of locking piston 222 is recessed as at 225. A compression spring 226 positioned between end wall 203 of portion 202 and the bottom wall of recess 225 exerts its bias normally to hold locking piston 222 in securing position relative to balls 219. Means for manually releasing balls 219 are provided, this means consisting of an axial projection 227 formed integral with body member 223 of locking piston 222. Projection 227 extends through an opening 228 in end wall 203 to the exterior where it may be grasped to pull locking piston 222 toward end wall 203 to displace reduced portion 224 to release balls 219.

Rod 214 of ram 212 is provided with an axially disposed passage 229 which communicates at its interior end with a recess 230 formed in the lower face 231 of piston 213 which in turn communicates with a right-angle passage 232 in cylinder portion 216. Passage 232, as shown, opens into bore 205 of cylinder housing 201 and slidably receives a valve 233. Valve 233 includes a piston 234 sealed with respect to the walls defining passage 232 and a rod 235 extending therefrom which fits into a transverse opening 236 formed in the wall of housing 201. To releasably maintain valve 233 within its passage 232 there is provided a release member 237 comprising a piston 238 slidably received within a recess 239 lying transverse to passage 236 and formed within an enlarged portion 240 of cylinder housing 201. Recess 239 communicates with a reduced passage 241 which intersects with passage 236. Piston 238 has projecting therefrom a shaft or rod 242. Shaft 242 extends through passage 241 and across passage 236 to serve as a stop upon which rod 235 bottoms. Rod 242 of release member 237 is maintained in its stop position by a compression spring 243 disposed in recess 239 and acting upon piston 238.

A pressure line 244 for providing compressed gas for actuation of release member 237 communicates at one of its ends with recess 239 and leads to any suitable source of energy such as compressed air or carbon dioxide which may be controlled by a suitable valve.

Longitudinally extending passage 229 of rod 214 of ram 212 at the exterior of cylinder 206 has communicating with it a flexible pressure line 245 which is suitably swaged in place. Line 245 leads to and is swaged into a port 246 of a slide valve member 247 which is similarly constructed to slide valve member 49 of the first embodiment. Valve member 247 also includes ports 248 and 249 and a pair of interconnected slide valves 251 and 252 reciprocably disposed within bore 253 of valve member 247 with slide valve 251 adapted to cover and uncover port 248 and slide valve 252 positionable to cover and uncover port 249. With the slide valves 251 and 252 in the full-line position of Figure 5 port 248 will be closed and port 249 open whereby pressure line 245 may vent through port 249 to atmosphere.

To effect movement of slide valves 251 and 252 within bore 253 there is provided a usual actuator 254 having a connection through actuator arm 255 with slide valve 251. Actuator 254 may be any appropriate device, mechanical or electrical, which can be operated by the pilot to effect reciprocation of actuator arm 255 for movement of slide valves 251 and 252.

One end of a flexible line 256 communicates with bore 253 of valve member 247 through port 248 and the opposite end communicates with bore 207 of cylinder 206 through a passage 257 in end closure 211. Cylinder 206 is charged with compressed gas or air through line 256, the source of such gas or air may appropriately be a bottle (not shown) of compressed carbon dioxide, nitrogen, or dry air or the pneumatic system of the aircraft. This gas or air is introduced into line 256 through a line 258 and a T-member 259 connected to line 256.

This modified actuator device 200 is adapted to serve as a counterbalance, hold-down and ejector for canopy 22 similarly to actuator 20 first described.

In serving as a counterbalance, the pilot will effect actuation of actuator arm 255 to shift slide valves 251 and 252 to the left, as viewed in Figure 5, whereupon slide valve 251 uncovers port 248 and slide valve 252 covers port 249. In this position the compressed gas or air from line 258 will pass through line 256 into the bore of cylinder 206 to act upon the upper face of piston 213 and will pass through bore 253 of valve member 247 into line 245 to be conducted through passage 229 of rod 214 to the lower face of piston 213. Since the area of the lower piston face on which pressure is applied is greater than the pressure area of the upper piston face by the area of rod 214 there will be a greater force acting thereupon which will cause ram 212 to move away from cylinder end wall 208 to project rod 214 away from cylinder 206. It is apparent that ram 212 of this modification operates in the same fashion as does ram 127 of the first embodiment and applies a force to canopy 22, to which it is connected, which counter-balances the opposed load imposed by the weight of the canopy. A shut-off valve (not shown) similar to shut-off valve 140 of the first embodiment is included in line 256 to dam the flow of compressed gas between the upper and lower faces of piston 213 thereby to hold the canopy 22 in a desired open position.

Cinch down action in this modification is accomplished by the pilot first moving canopy 22 to closed position and then actuating actuator arm 255 to move slide valves 251 and 252 into the position of Figure 5, wherein slide valve 251 closes port 248 and slide valve 252 uncovers port 249. Line 245 can now vent through ports 246 and 249 to atmosphere. This will evacuate the compressed gas or air beneath the lower face of piston 213, and pressure still being applied to the upper piston face the ram 212 will be held in its innermost position within cylinder 206 and a holding force will be applied through rod 214 to canopy 22 to maintain it in its closed position.

In jettisoning the canopy 22 the pilot will first free the canopy from its latches in any suitable manner and then effect actuation of actuator arm 255 to move slide valves 251 and 252 to uncover port 248 and cover port 249 to place the system in counterbalance condition. The pilot then introduces pressure into lead 244 to shift piston 238 of release member 237 to the right within recess 239 against the bias of spring 243. Piston 238 will carry with it shaft 242 to cause it to move out of engagement with rod 235 of valve 233. Pressure of the gas flowing through passage 229 of ram 212 will act through right angle passage 232 upon valve 233 to push it from passage 232. This will permit the gas present in passage 229 of ram 212 to enter into the bore 205 of housing 201 at the space behind end wall 208 of cylinder 206. Gas entering this space will drive locking piston 222 toward wall 203 of housing portion 202 against the action of compression spring 226 until portion 224 of locking piston 222 is free of balls 219. Balls 219 will then pull out of their detent recesses 221 as fingers 217 flex under the pressure of gas acting on cylinder wall 208, this releases cylinder 206 from its attachment to housing 201 and the gas pressure is now free to forcibly eject cylinder 206 and its ram 212 from housing 201. Canopy 22 being attached to ram 212 will be jettisoned clear of the airplane under this force. Leads 245, 256, valve 247, and the other equipment associated therewith may all be suitably attached to canopy 22 to be ejected therewith. If desired suitable couplings could be introduced in lines 245 and 256 which will separate in the ejection action to permit only a portion of lines 245 and 256 to be taken with cylinder 206 when it is expelled.

While certain preferred embodiments of the invention have been specifically disclosed it is understood that the invention is not limited thereto as many variations will be readily apparent to those skilled in the art and the invention is to be given its broadest possible interpretation within the terms of the following claims.

What I claim is:

1. An actuating device for a first element which is movably mounted upon a second element, said actuating device comprising a housing for connection with said second element, a cylinder within said housing adapted for slidable separation therefrom, locking means for releasably securing said cylinder to said housing, a ram having a piston head slidably receivable by said cylinder, said ram extending from said cylinder for connection to said first element, means in fluid connection with the interior of said cylinder for conducting pressure fluid to said cylinder for application on opposite faces of said piston head to provide a differential pressure force on said piston head actuable through said ram to counterbalance the load of said first element, and means having a fluid connection with the interior of said housing to provide a pressure force within said housing operable on said locking means to release said cylinder for ejection from said housing.

2. An actuating device for a first element which is movably mounted upon a second element, said actuating device comprising a housing for connection with said second element, a cylinder within said housing adapted for slidable separation therefrom, locking means for releasably securing said cylinder to said housing, a ram having a piston head slidably receivable by said cylinder, said ram extending from said cylinder for connection to said first element, valve means in fluid connection with the interior of said cylinder for controlling the introduction of pressure fluid to said cylinder for application on opposite faces of said piston head to provide a differential pressure force on said piston head actuable through said ram to counterbalance the load of said first element, and a power source carried by said housing to provide a pressure force within said housing operable on said locking means to release said cylinder and eject it from said housing.

3. An actuating device for a first element which is movably mounted upon a second element, said actuating device comprising a housing for connection with said second element, a cylinder within said housing adapted for slidable separation therefrom, locking means for releasably securing said cylinder to said housing, a ram having a piston head slidably receivable by said cylinder, said ram extending from said cylinder for connection to said first element, selectively operable valve means in fluid connection with the interior of said cylinder for controlling the introduction of pressure fluid to said cylinder for application on opposite faces of said piston head to provide a differential pressure force on said piston head actuable through said ram to counterbalance the load of said first element and for introducing pressure fluid to said cylinder for action on one face only of said piston head to apply a holding force to said first element through said ram, and gun means carried by said housing to provide a pressure force within said housing operable on said locking means to release said cylinder and eject it from said housing.

4. An actuating device for a closure member movably mounted for normal operation between closed and open positions on a support structure, said actuating device comprising a housing for connection with said support structure, a cylinder within said housing adapted for slidable separation therefrom, locking means for releasably securing said cylinder to said housing, a ram having a piston head slidably receivable by said cylinder, said ram extending from said cylinder for connection to said closure member, pressure fluid conduit means in fluid connection with the interior of said cylinder for conducting pressure fluid to said cylinder at opposite sides thereof, valve means associated with said conduits selectively operable to control the introduction of pressure fluid to said cylinder at opposite sides of said piston head to provide a differential pressure force on said piston head actuable through said ram to counterbalance the load of said first element, gun means carried by said housing, and pressure conduit means associated with said gun means to provide fluid pressure for discharge thereof to provide a pressure force within said housing operable on said locking means to release said cylinder and eject it and said ram from said housing.

5. An airplane canopy jettisoning assembly comprising an actuating device, said actuating device comprising a housing having an open end, a cylinder receivable through said open end for positioning within said housing, said cylinder having both ends closed, locking means for releasably securing said cylinder within said housing, a ram having a piston head slidably receivable within said cylinder and extending through an opening in one of said closed cylinder ends to the exterior thereof for connection to the canopy, said cylinder having fluid passages through the opposite ends thereof, pressure fluid conduits associated with said fluid passages for introducing pressure fluid into said cylinder for application on opposite faces of said piston head to provide a differential pressure force on said piston head actuable through said ram to counterbalance the load of said canopy, valve means associated with said conduits and operable to stop the passage of pressure fluid to one side of said cylinder whereby fluid pressure is applied to only one side of said piston head to retain said ram within said cylinder, power means carried by said housing and operable to provide a pressure force within said housing actuable on said locking means to release said cylinder and eject it from said housing to jettison said canopy.

6. An airplane canopy jettisoning assembly comprising an actuating device, said actuating device comprising a housing having an open end, a cylinder receivable through said open end for positioning within said housing, said cylinder having both ends closed, locking means for releasably securing said cylinder within said housing, a ram having a piston head slidably receivable within said cylinder and extending through an opening in a cylinder end to the exterior thereof for connection to the canopy, said cylinder having a passage through one end for introducing pressure fluid into the interior thereof for action on one face of said piston head, a tubular member having a closed end, a portion of said tubular member at the closed end thereof extending into said cylinder through the opposite end thereof, said tubular member having openings at said portion extending within said cylinder for passing pressure fluid thereinto for application to the opposite face of said piston head to provide a differential pressure force on said piston head which force is actuable through said ram to counterbalance the load of said canopy, normally open valve means associated with said tubular member adapted to close said openings therein, power means carried by said housing and operable to provide a pressure force within said housing actuable on said locking means to release said cylinder for movement, said valve means on movement of said cylinder moving to close said openings in said tubular member, said pressure force effective when said cylinder is released to eject it from said housing to jettison said canopy.

7. An airplane canopy jettisoning assembly comprising an actuating device, said actuating device comprising a housing having an open end, a cylinder receivable through said open end for positioning within said housing, said cylinder having both ends closed, locking means for releasably securing said cylinder within said housing, a ram having a piston head slidably receivable within said cylinder and extending through an opening in a cylinder end to the exterior thereof for connection to the canopy, said cylinder having a passage through one end for introducing pressure fluid into the interior thereof for action on one face of said piston head, a tubular member having a closed end, a portion of said tubular member at the closed end thereof extending into said cylinder through the opposite end thereof, said tubular member having openings at said portion extending within said cylinder for passing pressure fluid thereinto for application to the opposite face of said piston head to provide a differential pressure force on said piston head which force is actuable through said ram to counterbalance the load of said canopy, normally open valve means associated with said tubular member adapted to close said openings therein, a valve having a fluid connection through conduits with said passage through one end of said cylinder and with said tubular member and operable to stop the passage of pressure fluid through said tubular member whereby fluid pressure is applied only to one side of said piston head to retain said ram within said cylinder, power means carried by said housing and operable to provide a pressure force within said housing actuable on said locking means to release said cylinder for movement, said valve means on movement of said cylinder moving to close said openings in said tubular member, said pressure force effective when said cylinder is released to eject it from said housing to jettison said canopy.

8. Apparatus adapted for interconnection between a jettisonable member and a structure, said jettisonable member being normally movable between an open position and a closed position, said apparatus comprising a housing for connection to said structure, a cylinder releasably secured to said housing and forming a chamber therewith, releasable retaining means operable upon said cylinder and said housing to normally prevent relative movement therebetween, a piston operable within said cylinder and having an integral rod member extending outwardly of said cylinder for interconnection with said jettisonable member whereby there is correspondence of movement therebetween, said piston embodying opposing pressure faces of differential areas, selectively positionable valve means having fluid connections with the interior of said cylinder and operative in a first position to direct fluid to said pressure faces of said piston to oppose and counterbalance the weight of said jettisonable member and thereby permit easy manual movement of said jettisonable member between said open position and said closed position, said valve means being operative in a second position to direct fluid to one of said pressure faces to supplement the weight of said jettisonable member and thereby tend to maintain said jettisonable member in said closed position, and means having connection with said housing for admitting fluid pressure to said chamber formed by said cylinder and said housing and for releasing said retaining means whereby said cylinder and said housing may be driven apart to separate said jettisonable member from said structure.

9. Apparatus adapted for interconnection between a jettisonable member and a structure, said jettisonable member being normally movable between an open position and a closed position, said apparatus comprising a housing for connection to said structure, a cylinder releasably secured to said housing and forming a chamber therewith, retaining means operable upon said cylinder and said housing to normally prevent relative movement therebetween and releasable by entry of fluid under pressure into said chamber, a piston operable within said cylinder and having an integral rod member extending outwardly of said cylinder for interconnection with said jettisonable member whereby there is correspondence of movement therebetween, said piston embodying an inner pressure face and a rod pressure face of lesser effective area than said inner pressure face, valve means in fluid connection with said cylinder, said piston being provided with passages for fluid coupling said valve means and said inner pressure face, said valve means being operative in a first position to direct fluid into said cylinder and through said passages to said inner pressure face and said rod pressure face of said piston to oppose and counterbalance the weight of said jettisonable member and thereby permit easy manual movement of said jettisonable member between said open position and said closed position, said valve means being operative in a second position to direct fluid to said rod pressure face to supplement the weight of said jettisonable member and thereby tend to maintain said jettisonable member in said closed position, said cylinder embodying a control passageway in fluid communication at one end with said passages of said piston and at the other end with said chamber, a control element normally blocking said control passageway, and initiating means for selectively permitting said control element to be moved out of blocking relation by the action of fluid pressure upon said inner pressure face of said piston whereby fluid under pressure is permitted to enter said chamber whereby said retaining means is released and said cylinder and said housing are driven apart to effect forcible separation of said jettisonable member from said structure.

10. An actuating assembly for a movable member having an operative connection with a supporting structure and being adapted to be forceably separated from such supporting structure, said actuating assembly comprising a ram for connection with said movable member, a cylinder slidably receiving said ram, said cylinder having at least one end closed, a housing for connection with said supporting structure, said housing removably receiving said cylinder, latch means within said housing for releasably securing said cylinder against movement relative to said housing, means defining a fluid passage having communication with the interior of said cylinder for the introduction of pressure fluid into said cylinder between said closed end and said ram to apply a force to said ram to counterbalance the load of said movable member in connection therewith, and means defining a fluid passage having communication with the interior of said housing for introduction of pressure fluid thereinto for operation upon said latch means to release said cylinder for movement out of said housing under the force of said pressure fluid to carry said ram with it to forceably separate said movable member from its supporting structure.

11. An actuating assembly for attachment between a movable member and a supporting structure for said movable member and from which said movable member is adapted to be forceably separated, said actuating assembly comprising a ram for connection with said movable member, a cylinder within which said ram is slidably movable, said cylinder having at least one end closed, a housing for connection with said supporting structure, said housing removably receiving said cylinder, latch means within said housing for releasably locking said cylinder to said housing, means defining a fluid passage having communication with the interior of said cylinder for the introduction of pressure fluid thereinto between the closed end thereof and said ram to retain it against movement relative to said cylinder thereby to secure said movable member against movement relative to said supporting structure, and means defining a fluid passage having communication with the interior of said housing for introduction of fluid pressure thereinto for operation upon said latch means to release said cylinder for movement out of said housing under the force of said pressure fluid to carry said ram with it to forceably separate said movable member from its supporting structure.

12. An actuating assembly for attachment between a movable member and a supporting structure for said movable member and from which said movable member is adapted to be forceably separated, said actuating assembly comprising a ram for connection with said movable member, a cylinder within which said ram is slidably movable, said cylinder having the ends thereof closed, a housing for connection with said supporting structure, said housing removably receiving said cylinder, latch means within said housing for releasably locking said cylinder to said housing, means defining a fluid passage having communication with the interior of said cylinder through one closed end thereof for the introduction of pressure fluid into said cylinder for action on said ram in a first direction to retain it against movement relative to said cylinder thereby to secure said movable member against movement relative to said supporting structure, means defining a fluid passage having communication with the interior of said cylinder through the other of said closed ends for the introduction of pressure fluid into said cylinder to apply a force in the opposite direction upon said ram which is operative therethrough upon said movable member to counterbalance the load thereof, and means defining a fluid passage having communication with the interior of said housing for introduction of pressure fluid thereinto for operation upon said latch means to release said cylinder for movement out of said housing under the force of said pressure fluid to carry said ram with it to forceably separate said movable member from its supporting structure.

13. An actuating assembly for attachment between a movable member and a supporting structure for said movable member, said actuating assembly comprising a housing for connection with said supporting structure, a cylinder carried by said housing and adapted for slidable separation from said housing, said cylinder having closed ends, locking means within said housing for normally securing said cylinder in fixed relationship with said housing, a ram element for connection with said movable member and slidably carried within said cylinder, said ram element having opposed pressure faces of different area whereby said ram element is adapted to be urged in a direction corresponding to a differential fluid pressure applied against said pressure faces, said ram element and said movable member having correspondence of movement, control means having a fluid connection through each closed end of said cylinder for communication with the interior of the cylinder and adapted thereby to admit pressure fluid into said cylinder for action upon the pressure faces of said ram element, said control means being selectively operable to permit fluid pressure to act against said pressure faces to oppose the weight of said movable element to provide a counter-balancing action, and also to permit fluid pressure to act upon said pressure faces to augment the weight of said movable element to provide a holding down action, and means defining a fluid passage having communication with the interior of said housing for introduction of pressure fluid thereinto for operation upon said locking means to release said cylinder for separation from said housing.

References Cited in the file of this patent

UNITED STATES PATENTS

| | | |
|---|---|---|
| 1,828,643 | Cannon | Oct. 20, 1931 |
| 2,479,713 | Beach | Aug. 23, 1949 |
| 2,570,434 | Dow et al. | Oct. 9, 1951 |
| 2,780,961 | Musser et al. | Feb. 12, 1957 |